US010611262B2

(12) United States Patent
Erb et al.

(10) Patent No.: US 10,611,262 B2
(45) Date of Patent: Apr. 7, 2020

(54) ADAPTIVE CRUISE CONTROL SYSTEM

(71) Applicant: FORD GLOBAL TECHNOLOGIES, LLC, Dearborn, MI (US)

(72) Inventors: Dylan Erb, Allen Park, MI (US); Alexander Bartlett, Wyandotte, MI (US); Jacob Wiles, Plymouth, MI (US); Arun Sivan, Grosse Pointe, MI (US); Bikram Singh, Royal Oak, MI (US); Baocheng Sun, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

(21) Appl. No.: 15/871,537

(22) Filed: Jan. 15, 2018

(65) Prior Publication Data

US 2019/0217724 A1 Jul. 18, 2019

(51) Int. Cl.
*B60L 15/20* (2006.01)
*B60L 58/13* (2019.01)
*B60W 20/00* (2016.01)

(52) U.S. Cl.
CPC .......... *B60L 15/2045* (2013.01); *B60L 58/13* (2019.02); *B60L 2240/423* (2013.01); *B60W 20/00* (2013.01); *B60W 2510/244* (2013.01); *B60W 2510/305* (2013.01); *B60W 2530/10* (2013.01); *B60W 2530/16* (2013.01);
(Continued)

(58) Field of Classification Search
CPC ............ B60W 30/14; B60W 2720/10; B60W 2550/22; B60W 2550/145; B60W 2550/142; B60W 2550/12; B60W 2530/20; B60W 2530/16; B60W 2530/10; B60W 2510/305; B60W 2510/244; B60W 20/00; B60K 2310/20; B60L 15/2045;
(Continued)

(56) References Cited

U.S. PATENT DOCUMENTS 8,428,843 B2 * 4/2013 Lee ...................... B62D 15/025
180/282
8,930,115 B2 1/2015 Filev et al.
(Continued)

FOREIGN PATENT DOCUMENTS

DE 102011007034 A1 10/2012

*Primary Examiner* — Muhammad Shafi
(74) *Attorney, Agent, or Firm* — David Kelley; Brooks Kushman, P.C.

(57) ABSTRACT

Vehicles such as a combustion engine, electric, and/or hybrid electric vehicles and methods of operation, which include controller(s) configured to respond to cruise control signals, and to generate a route efficiency profile according to instantaneous vehicle performance parameters and environmental conditions. The controller(s) are also modified to adjust a vehicle cruise speed according to the signal and profile, to enable reaching at least one designated destination in a minimum time, and whereby vehicle range is extended to the destination, while one or more reserve energy limits of battery power and fuel are maintained. The controller(s) are also adapted to detect instantaneous feedback signals that include the performance parameters and environmental conditions, and to generate error signals according to an actual vehicle watt-hour per mile efficiency and the route efficiency profile. The controller(s) adjust the cruise speed adaptively according to the error signal, such that error signal magnitude is reduced.

19 Claims, 2 Drawing Sheets

(52) U.S. Cl.
CPC ..... *B60W 2530/20* (2013.01); *B60W 2550/12* (2013.01); *B60W 2550/142* (2013.01); *B60W 2550/145* (2013.01); *B60W 2550/22* (2013.01); *B60W 2720/10* (2013.01); *B60Y 2200/91* (2013.01); *B60Y 2200/92* (2013.01); *Y10S 903/93* (2013.01)

(58) Field of Classification Search
CPC .. B60L 58/13; B60L 2240/423; Y10S 903/93; B60Y 2200/92; B60Y 2200/91
USPC ......................................................... 701/22
See application file for complete search history.

(56) References Cited

U.S. PATENT DOCUMENTS

| | | | |
|---|---|---|---|
| 9,296,392 B2 | 3/2016 | Hartmann et al. | |
| 9,557,746 B2 * | 1/2017 | Nefedov | G05D 13/02 |
| 9,792,736 B1 | 10/2017 | Koebler et al. | |
| 10,017,178 B2 * | 7/2018 | Morimoto | B60W 30/14 |
| 10,046,778 B2 * | 8/2018 | Crane | B61L 15/0072 |
| 10,324,463 B1 * | 6/2019 | Konrardy | G01S 19/14 |
| 10,369,996 B2 * | 8/2019 | Yamakado | B60W 30/14 |
| 2004/0030471 A1 * | 2/2004 | Faye | B60K 6/48 |
| | | | 701/22 |
| 2008/0275644 A1 * | 11/2008 | Macneille | B60L 15/2045 |
| | | | 701/414 |
| 2011/0022255 A1 * | 1/2011 | Yamada | B60K 6/46 |
| | | | 701/22 |
| 2012/0041627 A1 * | 2/2012 | Kelty | B60L 15/2045 |
| | | | 701/22 |
| 2013/0024112 A1 * | 1/2013 | Tate, Jr. | G01C 21/3469 |
| | | | 701/439 |
| 2014/0163877 A1 * | 6/2014 | Kiyama | G01C 21/3469 |
| | | | 701/533 |
| 2015/0039169 A1 * | 2/2015 | Dextreit | B60W 50/0097 |
| | | | 701/22 |
| 2015/0066258 A1 * | 3/2015 | Loftus | B60L 58/12 |
| | | | 701/22 |
| 2015/0274021 A1 * | 10/2015 | Sato | B60L 3/003 |
| | | | 701/22 |
| 2016/0023649 A1 * | 1/2016 | Muller | G01C 21/26 |
| | | | 701/22 |
| 2016/0097650 A1 * | 4/2016 | Aich | B60L 58/12 |
| | | | 701/22 |
| 2016/0167640 A1 * | 6/2016 | Zettel | B60W 10/26 |
| | | | 701/22 |
| 2016/0167642 A1 * | 6/2016 | Debert | B60W 50/0097 |
| | | | 701/22 |
| 2016/0176309 A1 * | 6/2016 | Jeon | B60L 58/12 |
| | | | 701/22 |
| 2016/0250944 A1 * | 9/2016 | Christ | B60L 15/2045 |
| | | | 701/22 |
| 2016/0288789 A1 * | 10/2016 | Durgin | B60W 30/16 |
| 2018/0017398 A1 * | 1/2018 | McNew | G01C 21/3492 |
| 2019/0152488 A1 * | 5/2019 | Kotteri | B60W 30/146 |
| 2019/0161082 A1 * | 5/2019 | Fairgrieve | B60W 50/0097 |

* cited by examiner

ADAPTIVE CRUISE CONTROL SYSTEM

TECHNICAL FIELD

The disclosure relates to vehicle cruise systems that adaptively and automatically adjust cruise control parameters to enable arrival at a destination according to changing fuel and power availability, as well as dynamic vehicle performance and environmental conditions.

BACKGROUND

In combustion engine, electric, and hybrid electric vehicles (all of which are herein collectively referred to as HEVs), fuel consumption and/or battery discharge is affected by external environmental and traffic conditions, vehicle performance capabilities, driver behavior, and other factors. Previously, cruise control systems have been optimized only to maximize efficiency and minimize energy consumption. In the past, drivers have attempted to manually estimate whether sufficient available fuel and/or power remains to reach one or more destinations, and have had resort to hypermiling, hyperattentiveness, and other challenging driving techniques in attempts to conserve available energy and to enable the vehicle to reach an intended destination.

Such past systems and attempts have not enabled drivers to minimize time when trying to reach essential destinations, especially when available fuel and/or power is well below full capacity. In circumstances where much less than a full capacity of stored energy (battery and/or fuel) is available, and because it has been unduly challenging to manually and in real-time determine how much energy remains to reach a destination, drivers have over conserved energy, which can result in slow travel times and unnecessary delays in reaching a destination.

SUMMARY

Combustion engine vehicles (CEVs), hybrid electric vehicles (HEVs), and plug-in hybrid, and battery electric vehicles (PHEVs, BEVs, EVs) include fuel based combustion engines and/or a high voltage, electric traction battery or batteries, among other components and systems. During operation, available fuel and electric battery power is consumed, which reduces vehicle range. As available fuel and battery power is reduced, difficulty in accurately estimating and/or predicting vehicle range increases. Such range estimates vary widely due to the dynamic and stochastic nature of ever changing driver behavior, traffic, terrain, weather, and vehicle performance. During highway driving operation, vehicle cruise control can be utilized to assist in extending vehicle range to reach a designated destination, but the difficulty persists in accurately predicting and estimating remaining vehicle range.

Further challenges arise in generating predicted and estimate vehicle range and in enabling such HEVs to reach intended destinations in a minimum time and/or reduced time span, without over conservation of such available fuel and battery power. Previously, cruise control modes of operation constrained vehicle speeds to within a limited range of speeds that are close to an initial cruise control set speed, which range may span approximately one or two miles or kilometers per hour around the initial speed.

The disclosure is directed to improved, automated cruise control adjustments that can change the initial cruise control set speed to a suitable, different speed outside such limited ranges, which can minimize travel time to a destination, and which utilizes improved and more accurate predictions and estimates of vehicle range, in view of such stochastic and dynamic data. These improved automated adjustments, estimates, and predictions enable HEVs to reach designated destinations in a minimum and/or reduced span of time, while maintaining a minimum amount of fuel and/or electric battery power. The designated destinations include at least one and/or one, two, or more designated destination(s) that may be identified and/or designated via an internal vehicle navigation system and/or an external navigation system.

In configurations and methods of operation of the disclosure, CEVs/HEVs/PHEVs/BEVs (all collectively referred to herein for purposes of convenience without limitation as "HEVs") incorporates a controller that is, and/or controllers that are, configured to respond to HEV cruise control and/or cruise signals, which enables a cruise speed to be set and initiated when appropriate for HEV operation over uninterrupted stretches of roadway. In response to the cruise signal(s), the controller(s) generate a route efficiency profile according to changing and/or instantaneous vehicle performance parameters and environmental conditions, which profile predicts optimal HEV cruise speed and related performance parameters and settings.

The controller(s) is/are also adapted to adjust a vehicle cruise speed to adaptively extend HEV and/or vehicle range, according to the cruise signal and route efficiency profile, which enables the HEVs to reach at least one and/or one or more designated destination in a minimum and/or reduced span of time. Further, the adjusted vehicle cruise speed moderates HEV consumption of the available fuel and/or electric battery power, during cruise control operation, such that at least one and/or one or more respective reserve energy limits of battery power and fuel are maintained. The controller(s) are also adapted to detect changing and/or instantaneous performance parameters and environmental conditions. In further examples, the at least one and/or one or more respective reserve energy limits are adjustable and/or selectable, and are directed to a fuel limit that includes a minimum quantity of fuel, and/or a limit of battery power including a minimum state of charge of at least one vehicle traction battery. Such parameters and conditions may be detected directly by the controller(s) and/or be communicated via feedback signals generated by controller(s), sensors, and systems of HEV.

The disclosure also contemplates the controller(s) configured to generate one or more error signal(s) according to an actual vehicle watt-hour per mile efficiency and the route efficiency profile, which error signals identify, among other data, a magnitude of one or more differences between the route efficiency profile and the actual vehicle data during operation. In further variations, the error signal(s) embody, identify, and/or communicate the difference between the route efficiency profile, vehicle performance parameters, and/or environmental conditions, and the actual watt-hour per mile efficiency and related actual vehicle performance data and parameters.

The controller(s) adjust the cruise speed adaptively according to the error signal(s) as the error signal(s) change (s) over time, such that error signal magnitude(s) is/are reduced, and also such that the predicted, optimal cruise control speed, power, and/or related vehicle performance parameters and settings can be further prospectively adjusted during cruise control operation to more accurately predict, reflect, and/or identify actual HEV performance and efficiency. The reduced error signal magnitude(s) reflect increases accuracy in predicted and/or estimated route efficiency profile and related data and parameters.

In variations, the controller(s) is/are also configured to generate the route efficiency profile according to the changing and/or instantaneous vehicle performance parameters that include, for purposes of illustration but not limitation, speed and watt-hour per mile efficiency target profiles. The route efficiency profile, speed target profile, and/or watt-hour per mile efficiency target profile, are adjusted during cruise control operation according to directly detected, and/ or feedback signals that communicate, actual watt-hour per mile efficiency and at least one of and/or one, two, or more of vehicle geographic position or location, mass, tire pressure, drag, vehicle accessory load, and remaining energy available from fuel and/or battery electric power stores in the HEVs.

In further adaptations of the disclosure, the controller(s) is/are also configured to generate the route efficiency profile according to the environmental conditions, which include for purposes of example, changing and/or instantaneous, feedback signals that communicate during cruise control operation at least one or more of posted roadway speed limit, terrain or roadway inclination and elevation, wind speed and direction, nearby traffic speed and distance, vehicle to vehicle data, and atmospheric pressure, temperature, and humidity, and infrastructure to vehicle data, among other environmental conditions.

HEVs according to the disclosure also contemplate modifications of the controller also configured to communicate to one or more other vehicle and/or external controller(s), display, and/or other components, the route efficiency profile, actual vehicle efficiency data, and/or one or more of the changing and/or instantaneous vehicle performance parameters and environmental conditions, and/or one or more predicted variables that include changing and/or instantaneous vehicle range, trip time span or duration, and available reserve energy and fuel/battery power remaining, at and/or when the HEV reaches the at least one designated destination.

In further adaptations of the disclosure, the controller(s) also are configured to receive one or more selections of and/or changes to the one or more designated destination(s) and/or the one or more respective reserve energy limits of battery power and fuel. Responsive to the received changes and/or selections, the controller(s) are modified to adjust the cruise speed adaptively according to the changes, such that the HEVs reach the at least one designated destination in a new minimum and reduced time span.

This summary of the implementations and configurations of the HEVs and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to enable embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
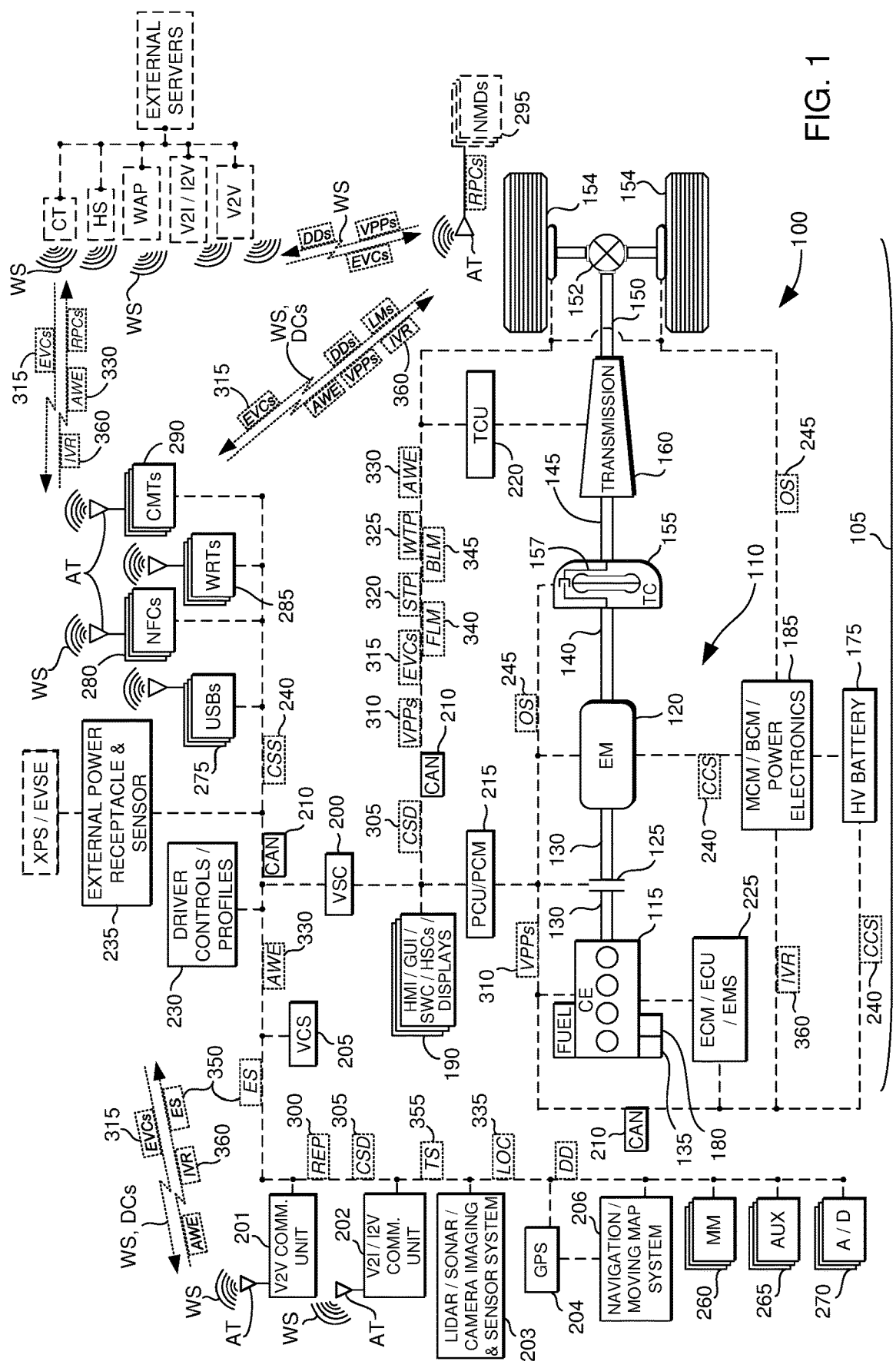
FIG. 1 is an illustration of a combustion engine and hybrid electric vehicle and its systems, components, sensors, actuators, and methods of operation.
Figure 2:
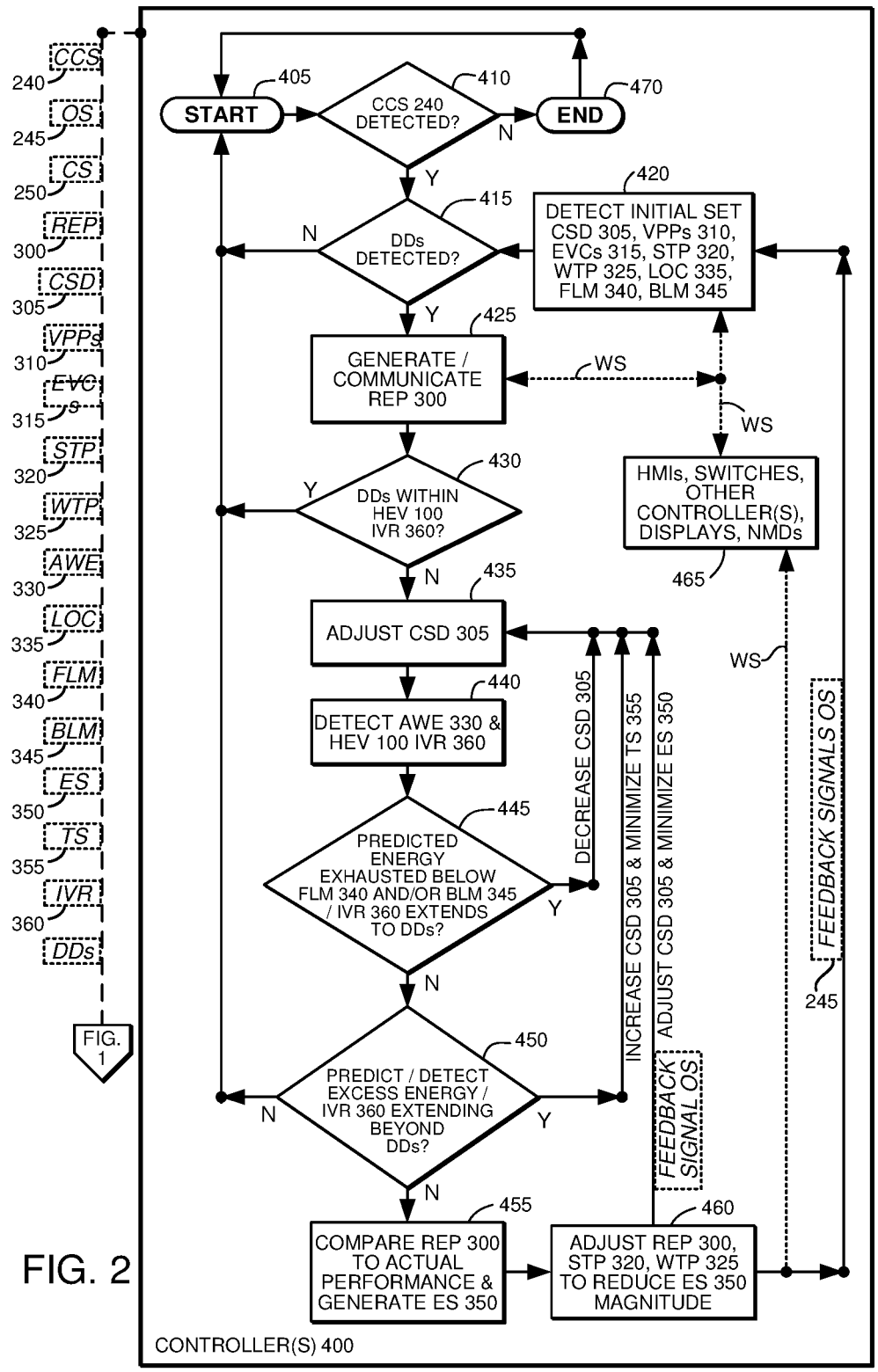
FIG. 2 illustrates certain aspects of the disclosure depicted in FIG. 1, with components removed and rearranged for purposes of illustration.

With reference now to the various figures and illustrations and to FIGS. 1 and 2, and specifically to FIG. 1, a schematic diagram of a combustion engine vehicle (CEV) and/or hybrid electric vehicle (HEV) 100 is shown, and illustrates representative relationships among components of HEV 100, which can also be an electric vehicle (EV), a battery electric vehicle (BEV), a plug-in hybrid electric vehicle (PHEV), and combinations and modifications thereof, which are herein collectively referred to as an "HEV". Physical placement and orientation of the components within vehicle 100 may vary according to application requirements and implementations.

Vehicle 100 includes a driveline 105 that has a powertrain 110, which includes a combustion engine (CE) 115 and/or an electric machine or electric motor/generator/starter (EM) 120, which generate power and torque to propel vehicle 100. Engine or CE 115 is a gasoline, diesel, biofuel, natural gas, or alternative fuel powered combustion engine, which generates an output torque in addition to other forms of electrical, cooling, heating, vacuum, pressure, and hydraulic power by way of front end engine accessory devices (FEADs) described elsewhere herein. CE 115 is coupled to electric machine or EM 120 with a disconnect clutch 125. CE 115 generates such power and associated engine output torque for transmission to EM 120 when disconnect clutch 125 is at least partially engaged.

EM 120 may be any one of a plurality of types of electric machines, and for example may be a permanent magnet synchronous motor, electrical power generator, and engine starter 120. For example, when disconnect clutch 125 is at least partially engaged, power and torque may be transmitted from engine 115 to EM 120 to enable operation as an electric generator, and to other components of vehicle 100. Similarly, EM 120 may operate as a starter for engine 115 with disconnect clutch 125 partially or fully engaged to transmit power and torque via disconnect clutch drive shafts 130 to engine 115 to start engine 115, in vehicles that include or do not include an independent engine starter 135.

Further, EM or electric machine 120 may assist engine 115 in a "hybrid electric mode" or an "electric assist mode" by transmitting additional power and torque to turn drive shafts 130 and 140, in addition to that supplied by CE 115. Also, EM 120 may operate in an electric only mode wherein engine 115 is decoupled by disconnect clutch 125 and which may be shut down, enabling EM 120 to transmit positive or negative (reverse) mechanical torque to EM drive shaft 140 in forward and reverse directions. When in a generator mode, EM 120 may also be commanded to produce negative electrical torque (when being driven by CE 115 and/or other drivetrain elements) and to thereby generate electricity for charging batteries and powering vehicle electrical systems, and while CE 115 is generating propulsion power for vehicle 100. EM 120 and/or other electric motor generators also may enable regenerative braking when in generator mode by converting rotational, kinetic energy from powertrain 110 and/or wheels 154 during deceleration, into negative electrical torque, and into regenerated electrical energy for storage, in one or more batteries 175, 180, as described in more detail below.

Disconnect clutch 125 may be disengaged to enable engine 115 to stop or to run independently for powering engine accessories, while EM 120 generates drive power and torque to propel vehicle 100 via EM drive shaft 140, torque convertor drive shaft 145, and transmission output drive shaft 150. In other arrangements, both engine 115 and EM 120 may operate with disconnect clutch 125 fully or partially engaged to cooperatively propel vehicle 100 through drive shafts 130, 140, 150, differential 152, and wheels 154. Each or any such components may also be combined in part and/or entirely in a comparable transaxle configuration (not shown). Driveline 105 may be further modified to enable regenerative braking from one or any or all wheel(s) 154, using a selectable and/or controllable differential torque capability. Although FIG. 1 schematically depicts two wheels 154, the disclosure contemplates driveline 105 to include additional wheels 154.

The schematic of FIG. 1 also contemplates alternative configurations with more than one engine 115 and/or EM 120, which may be offset from drive shafts 130, 140, and where one or more of engines 115 and EMs 120 are positioned in series and/or in parallel elsewhere in driveline 105, such as between or as part of a torque convertor and a transmission, and/or a transaxle, off-axis from the drive shafts, and/or elsewhere and in other arrangements. Still other variations are contemplated without deviating from the scope of the present disclosure. Driveline 105 and powertrain 110 also include a transmission that includes a torque convertor (TC) 155, which couples engine 115 and EM 120 of powertrain 110 with and/or to a transmission 160. TC 155 may further incorporate a bypass clutch and clutch lock 157 that may also operate as a launch clutch, to enable further control and conditioning of the power and torque transmitted from powertrain 110 to other components of vehicle 100.

Powertrain 110 and/or driveline 105 further include one or more electric traction and/or propulsion batteries 175, 180. One or more such traction/propulsion batteries can be a higher voltage, direct current traction or propulsion battery or batteries 175 operating in ranges between about 48 to 600 volts, and sometimes between about 140 and 300 volts or more or less, which is/are used to store and supply power for EM 120 and during regenerative braking for capturing and storing energy, and for powering and storing energy from other vehicle components and accessories. Other vehicle batteries can be a low voltage, direct current battery(ies) 180 operating in the range of between about 6 and 24 volts or more or less, which is/are used to store and supply power for starter 135 to start engine 115, and for other vehicle components and accessories.

Batteries 175, 180 are respectively coupled to engine 115, EM 120, and vehicle 100, as depicted in FIG. 1, through various mechanical and electrical interfaces and vehicle controllers, as described elsewhere herein. High voltage EM battery 175 is also coupled to EM 120 by one or more of a motor control module (MCM), a battery control module (BCM), and/or power electronics 185, which are configured to convert and condition direct current (DC) power provided by high voltage (HV) battery 175 for EM 120.

MCM/BCM/power electronics 185 are also configured to condition, invert, and transform DC battery power into three phase alternating current (AC) as is typically required to power electric machine or EM 120. MCM/BCM 185/power electronics is also configured to charge one or more batteries 175, 180 with energy generated by EM 120 and/or front end accessory drive components, and to receive, store, and supply power from and to other vehicle components as needed. Such controllers, including for example, those incorporated with power electronics 185 are configured to monitor battery sensors to detect voltage, current, state-of-charge (SoC), charge the battery(ies), to adjust and control a charge-rate and charge-time therefor, to monitor and estimate fuel economy, to monitor recharging, and to discharge and deliver power from the battery(ies), among other capabilities.

With continued reference to FIG. 1, vehicle 100 further includes one or more controllers and computing modules and systems, in addition to MCM/BCM/power electronics 185, which enable a variety of vehicle capabilities. For example, vehicle 100 may incorporate a vehicle system controller (VSC) 200 and a vehicle computing system (VCS) and controller 205, which are in communication with MCM/BCM 185, and other controllers, and a vehicle network such as a controller area network (CAN) 210, and a larger vehicle control system and other vehicle networks that include other micro-processor-based controllers as described elsewhere herein. CAN 210 may also include network controllers in addition to communications links between controllers, sensors, actuators, and vehicle systems and components, as is illustrated schematically in the figures, for purposes of example without limitation, as dotted and/or dashed lines, and with similar schematic and graphical representations.

Such CANs 210 are known to those skilled in the technology and are described in more detail by various industry standards, which include for example, among others, Society of Automotive Engineers International™ (SAE) J1939, entitled "Serial Control and Communications Heavy Duty Vehicle Network", and available from standards. sae. org, as well as, car informatics standards available from International Standards Organization (ISO) 11898, entitled "Road vehicles—Controller area network (CAN)," and ISO 11519, entitled "Road vehicles—Low-speed serial data communication."

With continued reference to FIG. 1, vehicle 100 further includes one or more controllers and computing modules and systems, in addition to the controller(s) already described, which enable a variety of vehicle capabilities. For example, in some configurations for purposes of example but not limitation, VSC 200 and/or VCS 205 is/are and/or incorporates the SYNC™, APPLINK™, MyFord Touch™ and/or open source SmartDeviceLink and/or OpenXC onboard and offboard vehicle computing systems, in-vehicle connectivity, infotainment, and communications system and application programming interfaces (APIs), for communication and control of and/or with offboard and/or external devices, systems, and components.

For further examples, but not for purposes of limitation, at least one of and/or one or more of the controller(s) such as VSC 200 and VCS 205, may incorporate and further be and/or include one or more accessory protocol interface modules (APIMs) and/or an integral or separate head unit, which may be, include, and/or incorporate an information and entertainment system (also referred to as an infotainment system and/or an audio/visual control module or ACM/AVCM). Such modules include and/or may include a multimedia devices such as a media player (MP3, Blu-Ray™, DVD, CD, cassette tape, etc.), stereo, FM/AM/satellite radio receiver, and the like, as well as a human machine interface (HMI) 190, graphical user interface (GUI) 190, and/or display unit(s) 190 as described elsewhere herein.

Such contemplated components and systems are available from various sources, and are for purposes of example manufactured by and/or available from the SmartDeviceLink Consortium, the OpenXC project, the Ford Motor Company, and others. See, for example, U.S. Pat. Nos. 9,080,668, 9,042,824, 9,092,309, 9,141,583, 9,141,583, 9,680,934, and others.

In further examples, SmartLinkDevice (SDL), OpenXC, and SYNC™ AppLink™ are each illustrative exemplars that enable at least one of and/or one or more of the controller(s) such as VSC 200 and VCS 205, to communicate remote procedure calls (RPCs) utilizing embedded application programming interfaces (APIs) that enable command and control of internal and external or onboard and offboard devices, mobile devices, and applications, by utilizing in-vehicle or onboard HMIs, GUIs, and other input and output devices 190. Such further include onboard vehicle instrument cluster hardware and software controls (HSCs), buttons, and/or switches, as well as steering wheel controls and buttons (SWCs), instrument cluster and panel hardware and software buttons and switches 190, among other controls, also depicted in the figures schematically and collectively with reference numeral 190 (FIG. 1). Exemplary systems such as SDL, OpenXC, and/or AppLink™ enable functionality of the mobile device to be available and enabled utilizing the HMI of vehicle 100 such as HSCs, SWCs, HMIs, and GUIs 190.

VCS 205 and/or other controller(s) may include, be configured with, and/or cooperate with one or more communications, navigation, and other systems, units, controllers, and/or sensors, such as a vehicle to vehicle communications system (V2V) 201, and roadway and cloud-based network infrastructure to vehicle and vehicle to infrastructure communication system (I2V, V2I) 202, a LIDAR/SONAR (light and/or sound detection and ranging) and/or video camera roadway proximity imaging and obstacle sensor system 203, a GPS or global positioning system 204, and a navigation and moving map display and sensor system 206.

Such communications systems, units, controllers, may be configured with, as, and be part of other communications units and enable bidirectional communications by wired and wireless communications that may include cellular, wireless ethernet and access points such as WiFi™ wireless capabilities, near field communications such as Bluetooth™, and many others. The VCS 205 can cooperate in parallel, in series, and distributively with VSC 200 and other controllers to manage and control HEV 100 and such other controllers, and/or actuators, in response to sensor and communication signals, data, parameters, and other information identified, established by, communicated to, and received from these vehicle systems, controllers, and components, as well as other systems external and/or remote to HEV 100.

While illustrated here for purposes of example, as discrete, individual controllers, MCM/BCM 185, VSC 200, and VCS 205 may control, be controlled by, communicate signals to and from, and exchange data with other controllers, and other sensors, actuators, signals, and components that are part of the larger vehicle and control systems, external control systems, and internal and external networks. The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers both in the singular and plural connotations, and individually, collectively, and in various suitable cooperative and distributed combinations.

Further, communications over the network and CAN 210 are intended to include responding to, sharing, transmitting, and receiving of commands, signals, data, embedding data in signals, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to precondition and preprocess particular signals during communications, and before and after such are communicated.

In further illustrations, MCM/BCM 185, VSC 200, VCS 205, CAN 210, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing and communicating data.

With attention invited again to FIG. 1, HEV 100 also may include a powertrain control unit/module (PCU/PCM) 215 coupled to VSC 200 or another controller, and coupled to CAN 210 and engine 115, EM 120, and TC 155 to control each powertrain component. A transmission control unit (TCU) 220 is also coupled to VSC 200 and other controllers via CAN 210, and is coupled to transmission 160 and also optionally to TC 155, to enable operational control. An engine control module (ECM) or unit (ECU) or energy management system (EMS) 225 may also be included having respectively integrated controllers and be in communication with CAN 210, and is coupled to engine 115 and VSC 200 in cooperation with PCU 215 and TCU 220 and other controllers.

In this arrangement, VSC 200 and VCS 205 cooperatively manage and control the vehicle components and other controllers, sensors, and actuators, including for example without limitation, PCU 215, TCU 220, MCM/BCM 185, and/or ECU/EMS 225, among various others. For example, the controllers may communicate control commands, logic, and instructions and code, data, information, and signals to and/or from engine 115, disconnect clutch 125, EM 120, TC 155, transmission 160, batteries 175, 180, and MCM/BCM/ power electronics 185, and other components and systems.

The controllers also may control and communicate with other vehicle components known to those skilled in the art, even though not shown in the figures. The embodiments of vehicle 100 in FIG. 1 also depict exemplary sensors and actuators in communication with vehicle network and CAN 210 that can transmit and receive signals to and from VSC 200, VCS 205, and other controllers. Such control commands, logic, and instructions and code, data, information, signals, settings, and parameters, including driver preferred settings and preferences, may be captured and stored in, and retrieved and communicated from a repository of driver controls and profiles 230.

For further example, various other vehicle functions, actuators, and components may be controlled by the controllers within and in cooperation with HEV 100 systems and components, and may receive signals from other controllers, sensors, and actuators, which may include, for purposes of illustration but not limitation, front-end accessory drive (FEAD) components and various sensors for battery charging or discharging, including sensors for detecting and/or determining the maximum charge, charge-state or state-of-charge (SoC), voltage and current, battery chemistry and life-cycle parameters, and discharge power limits, external environment ambient air temperature (TMP), pressure, humidity, and component temperatures, voltages, currents, and battery discharge power and rate limits, and other components. Such sensors are configured to communicate with the controllers and CAN 210 and may, for further example, establish or indicate ignition switch position (IGN) and a key-on or key-off condition, external environment temperature and pressure, engine and thermal management system sensors, and related data communications sensors, among others.

HEV 100 also includes at least one external power source receptacle and sensor 235, which is coupled with the various controllers, including for example BCM/MCM/power electronics 185 and HV battery 175. Receptacle 235 is utilized when HEV 100 is stationary and parked adjacent to an external power source (XPS), such as in a home, office, or other electrical power charging station or location, which stations are also known to those knowledgeable in the technology as electric vehicle supply equipment (EVSE). These controllers are configured to detect the presence of XPS when it is connected to receptacle 235, and to initiate a charging/recharging cycle or event of HV battery 175, battery 180, as well as enabling power to be supplied to HEV 100 for various purposes.

Variations of the disclosure contemplated HEV 100 including one or more of the various controller(s), such as for example VSC 200, VCS 205, and/or others configured to enable a vehicle speed cruise control capability, which generates a cruise control mode and signal and/or cruise signal (CCS) 240 to initiate cruise control mode and operation, and which includes an initial cruise control set speed, such that HEV 100 can operate at a speed initially set by the controller(s), a driver, and/or an automated or semi-automated vehicle navigation system.

As described and illustrated in the various figures, including FIGS. 1 and 2, the signals and data, including for example, cruise signal CCS 240, and related control logic and executable instructions and other signals, and data can also include other and/or feedback signals (OS) 245, and control or command signals (CS) 250 received from and sent to and between controllers and vehicle components and systems. The cruise control and/or cruise signal CCS 240, OS 245, and CS 250, and other signals, related control logic and executable instructions, parameters, and data can and/or may be predicted, generated, established, received, communicated, to, from, and between any of the vehicle controllers, sensors, actuators, components, and internal, externals, and remote systems.

Any and/or all of these signals can be raw analog or digital signals and data, or preconditioned, preprocessed, combination, and/or derivative data and signals generated in response to other signals, and may encode, embed, represent, and be represented by voltages, currents, capacitances, inductances, impedances, and digital data representations thereof, as well as digital information that encodes, embeds, and/or otherwise represents such signals, data, and analog, digital, and multimedia information.

The communication and operation of the described signals, commands, control instructions and logic, and data and information by the various contemplated controllers, sensors, actuators, and other vehicle components, may be represented schematically as shown in FIGS. 1 and 2, and by flow charts or similar diagrams as exemplified in the methods of the disclosure illustrated specifically in FIG. 2. Such flow charts and diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof.

The steps and functions shown may be executed, communicated, and performed in the sequence depicted, and in parallel, in repetition, in modified sequences, and in some cases may be combined with other processes and/or omitted. The commands, control logic, and instructions may be executed in one or more of the described microprocessor-based controllers, in external controllers and systems, and may be embodied as primarily hardware, software, virtualized hardware, firmware, virtualized hardware/software/ firmware, and combinations thereof.

With continuing reference to the various figures, including FIG. 1 the disclosure contemplates HEV 100 including at least one and/or one or more of the controller(s), which may be any of VSC 200, VCS 205, PCU 215, TCU 220, MCM/BCM 185, and/or ECU/EMS 225, and a communication unit or units, such as VSC 200, V2V 201, I2V/V2I 202, and/or communications units incorporated with VCS

205. At least one, one or more, and/or any of such controllers are also configured to generate and communicate CCS 240, which identifies or indicates initial operation of the HEV 100 cruise speed control system. One or more of these controller(s) are also in communication with and coupled to at least one and/or one or more of the vehicle onboard communications units 200, 201 202, 205, and others, and in some variations are also in communication with and coupled to external devices and components as described elsewhere herein.

In additional examples for illustration purposes, HEV 100 may also further include, incorporate, be paired to, synchronized with, and/or be coupled with, as such communication units and/or as components and/or subsystems thereof, one or more and/or at least one vehicle-based and onboard multimedia devices 260 (MM), auxiliary input(s) 265 (AUX), and analog/digital (A/D) circuits 270, universal serial bus port(s) (USBs) 275, near field communication transceivers (NFCs) 280, wireless routers and/or transceivers (WRTs) 285, such as Bluetooth™ devices, that enable wireless personal and local area networks (WPANs, WLANs) or "WiFi" IEEE 802.11 and 803.11 communications standards.

The controller(s) and devices(s) of vehicle 100 are also coupled with, incorporate, and/or include onboard and/or offboard analog and digital cellular network modems and transceivers (CMTs) 290 utilizing voice/audio and data encoding and technologies that include for example, those managed by the International Telecommunications Union (ITU) as International Mobile Telecommunications (IMT) standards, which are often referred to as global system for mobile communications (GSM), enhanced data rates for GSM evolution (EDGE), universal mobile telecommunications system (UMTS), 2G, 3G, 4G, 5G, long-term evolution (LTE), code, space, frequency, polarization, and/or time division multiple access encoding (CDMA, SDMA, FDMA, PDMA, TDMA), and similar and related protocols, encodings, technologies, networks, and services.

Such contemplated onboard and offboard devices and components, among others, are configured to enable bidirectional wired and wireless communications between components and systems of vehicle 100, CAN 210, and other external devices and systems and PANs, LANs, and WANs. A/D circuit(s) 270 is/are configured to enable analog-to-digital and digital-to-analog signal conversions. Auxiliary inputs 265 and USBs 275, among other devices and components, may also enable in some configurations wired and wireless Ethernet, onboard diagnostic (OBD, OBD II), free-space optical communication such as Infrared (IR) Data Association (IrDA) and non-standardized consumer IR data communication protocols, IEEE 1394 (FireWire™ (Apple Corp.), LINK™ (Sony), Lynx™ (Texas Instruments)), EIA (Electronics Industry Association) serial protocols, IEEE 1284 (Centronics Port protocols), S/PDIF (Sony/Philips Digital Interconnect Format), and USB-IF (USB Implementers Forum), and similar data protocols, signaling, and communications capabilities.

Auxiliary inputs 265 and A/D circuits 270, USBs 275, NFCs 280, WRTs 285, and/or CMTs 290, is/are coupled with, integrated with, and/or may incorporate integral amplifier, signal conversion, and/or signal modulation circuits, which are configured to attenuate, convert, amplify, and/or communicate signals, and which are further configured to receive various analog and/or digital input signals, data, and/or information that is processed and adjusted and communicated to and between the various wired and wireless networks and controllers.

Such wired and wireless contemplated networks and controllers include, for example but not limitation, CAN 210, VSC 200, VCS 205, and other controllers and networks of vehicle 100. Auxiliary inputs 265, A/D circuits 270, USBs 275, NFCs 280, WRTs 285, and/or CMTs 290, and related hardware, software, and/or circuitry are compatible and configured to receive, transmit, and/or communicate at least one of and/or one or more of a variety of wired and wireless signals, signaling, data communications, and/or data streams (WS), and data such as navigation, audio and/or visual, and/or multimedia signals, commands, control logic, instructions, information, software, programming, and similar and related data and forms of information.

Additionally, one or more input and output data communication, audio, and/or visual devices 190, are contemplated to be integrated with, coupled to, and/or connectable to, auxiliary inputs 265, A/D circuits 270, USBs 275, NFCs 280, WRTs 285, and/or CMTs 290, as well as to the other contemplated controller(s) and wired and wireless networks internal to vehicle 100, and in some circumstances external to and offboard vehicle 100. For example, the one or more input and output devices include additional display(s) 190, and nomadic and mobile devices (NMDs) 295, among others, which each include at least one and/or one or more integrated signaling and communications antennas and/or transceivers (AT).

Such input and output devices 190 are and/or may be selectable, connectable, synchronized with, paired to, and/or actuatable with an input selector that may be any of HSCs 190, and may also include, incorporate, and/or be integrated with and/or as part of GUI 190 and the contemplated hardware and software HSCs, SWCs, controls, buttons, and/or switches 190. Such HSCs 190, as already noted, may be hardware or software or combinations thereof and may be configurable utilizing one or more predetermined, default, and adjustable factory and/or driver controls, profiles, and/or preferences of repository 230.

The contemplated additional display(s) 190, NMDs 295, and/or other portable auxiliary devices, may further include for example but not limitation, cell phones, mobile phones, smart phones, satellite phones and modems and communications devices, tablets, personal digital assistants, personal media players, key fob security and data storage devices, personal health devices, laptops, portable wireless cameras, headsets and headphones that may include microphones, wired and wireless microphones, portable NFC and Bluetooth compatible speakers and stereo devices and players, portable navigation and GPS and GNSS devices, and similar devices and components that each may include integrated transceivers and antennas AT, wired, wireless, and plugged data connectors and data connections (DCs), and related components, for wired and wireless multimedia and data communications signals WS.

Such contemplated input, output, and/or communications devices, components, subsystems, and systems onboard vehicle 100 are and/or may be configured to bidirectionally communicate over wired and wireless data connections DCs and wired and wireless signals and signaling and data communications and data streams WS, with external near and far nomadic, portable, and/or mobile devices 295, networks, and external communications systems (V2X) that may include, for example, roadway and infrastructure communications systems (V2I/I2V) 202, such as hotspots and wireless access points (HS/WAPs, FIG. 1), nano and micro and regular cellular access points and towers (CT, FIG. 1), and related and accessible external, remote networks, systems, and servers.

With continuing reference to the various figures, including FIGS. 1 and 2, it may be understood by those with knowledge in the relevant fields of technology that the disclosure contemplates vehicle and/or HEV 100 to include at least one and/or one or more controller(s) such as VSC 200, VCS 205, and others coupled with one or more an in-vehicle or onboard transceiver AT, such as those described in connection with USBs 275, NFCs 280, WRTs 285, and/or CMTs 290. The controller(s) 200, 205, and others, and transceiver(s) AT, are configured to detect WSs and connect to nearby or proximate or far wired and wireless network devices having in-range WSs, as well as third-party, offboard, external devices such as nomadic, portable, and/or mobile or nomadic mobile devices and displays 295.

The one or more controller(s) VSC 200, VCS 205, and others, are configured to generate the various OS 245, CS 250, and other signals to include and/or cause generation of CCS 240 in response to vehicle instrument cluster switch actuations, automated navigation system settings, and other signals and information as described elsewhere herein. One or more of the controller(s) are further configured to generate a route efficiency profile REP 300, in response to detecting CCS 240.

The REP 300 establishes predicted and optimal vehicle performance settings that enable the controller(s) to adaptively adjust the initial cruise control set speed to another cruise control and/or cruise speed CSD 305, which is initially set as a baseline vehicle speed according to CCS 240 and the initial set speed, and one or more of a driver selection, an automated navigation system setting, an autopilot capability or setting, and/or other vehicle navigation and control system capabilities.

REP 300 and/or CSD 305 is/are communicated internally and onboard vehicle and HEV 100, and in some implementations, externally to offboard devices and components with one or more of in-vehicle or onboard transceiver(s) AT that are coupled with USBs 275, NFCs 280, WRTs 285, CMTs 290, NMDs 295, V2V 201, V2I/I2V 202, and/or other communication units, and via one or more signaling paths WSs. Although initially set according to CCS 240 upon initiation of cruise control mode and operation of HEV 100, the controller(s) adjust CSD 305 to adapt the initial set speed according to the dynamic, stochastic VPPs 310 and EVCs 315, to another speed that enables faster travel to one or more designated destinations (DDs), without unnecessary over conversation of battery and/or fuel power reserves, and so as to minimize and/or reduce the travel time and/or time span otherwise needed to reach DDs.

REP 300 is generated by the controller(s) that is/are configured to respond to one or more of CCS 240 and/or CSD 305 to enable the cruise speed to be set and initiated for HEV operation over stretches of roadway when appropriate and/or desired. In response to CCS 240, the controller(s) generate REP 300 according to changing and/or instantaneous vehicle performance parameters VPPs 310 and environmental conditions EVCs 315. REP 300 also utilizes the initial or baseline set speed CSD 305, and predicts one or more optimal HEV cruise speed(s) and related performance parameters and settings for a range of VPPs 310 and EVCs 315.

At least one of the controller(s) VSC 200, VCS 205, and others, are also configured to detect, capture, generate, adjust, and/or communicate various vehicle and systems and subsystems data, information, vehicle trip segment and predicted en-route-time-to-destination data, and related data as elements of one or more of VPPs 310, EVCs 315, and other parameters, data, and conditions, which are also communicated within and externally to vehicle and HEV 100 via the various communication units and signaling paths.

In variations, the controller(s) is/are also configured to generate and/or adjust REP 300 according to the changing and/or instantaneous VPPs 310 that include, for purposes of illustration but not limitation, speed and watt-hour per mile efficiency target profiles TPs 320, 325. The REP 300, speed target profile (STP) 320, and/or watt-hour per mile (or kilometer) (w-h/m or w-h/km) efficiency target profile (WTP) 325, are adjusted by the controller(s) during cruise control operation of HEV 100, according to directly detected and/or feedback signals OS 245 that communicate an actual watt-hour per mile efficiency AWE 330, and at least one or more of vehicle geographic position or location LOC 335, mass, and remaining energy available from fuel and/or battery electric power stores in HEV 100. Vehicle geographic location data LOC 335 may also be generated by the vehicle controller(s) and obtained from in-vehicle and onboard as well as external offboard GPS devices including vehicle GPS 204 and navigation system 206, and/or NMDs 295, among other controllers and components.

Such VPPs 310 also can include, for purposes of added illustration and example, but not for purposes of limitation, coasting, acceleration, and braking data, the remaining energy available as calculated from actual fuel remaining and consumption and capacity, actual battery power capacity and state of charge and consumption and power remaining, tire pressure and coefficient of rolling friction, aerodynamic drag, vehicle make and model information, vehicle identification number (VIN), onboard diagnostic codes and parameter/performance identifiers and information data (OBDs, OBD IIs, PIDs), and settings and preferences and power demands or requirements or loads for vehicle accessories such as climate controls, interior and external vehicle lighting, infotainment system, navigation system, and other HEV systems, subsystems, accessories, components, and/or devices.

REP 300 includes one or more of such VPPs 310 that are stored in REP 300 as the optimal, calibrated profile parameters and settings for various vehicle performance capabilities according to driver behaviors and preferences for a range of environmental temperature, pressure, humidity, and roadway conditions, such that the REP 300 parameters are utilized to adjust changing and/or instantaneous vehicle performance variables, parameters, settings, and conditions during operation to enable optimal performance according to such behaviors, preferences, and environmental conditions.

STP 320 is in some variations stored as part of REP 300, and additionally includes of a range of ICE 115, EM 120, and HEV 100 speeds, and one or more related optimally calibrated, target vehicle performance variables, settings, and parameters, from and in addition to the contemplated VPPs 310, for each of a range of environmental conditions and driver preferences, which are utilized and adjusted during operation to enable optimal vehicle performance for each of such target speeds in the range, for ICE 115, EM(s) 120, battery(ies) 175, power electronics 185, and the associated controllers and computing systems of HEV 100.

WTP 325 includes a range of w-h/m or w-h/km efficiency values and optimal, target vehicle performance settings, variables, and parameters from VPPs 310, which are calibrated to enable optimum w-h/m or w-h/km efficiency for each value in the range of efficiencies, during operation of ICE 115, EM(s) 120, battery(ies) 175, power electronics 185, and the associated controllers of HEV 100. REP 300, STP 320, and/or WTP 325 are utilized alone and in combination to calibrate different VPPs 310 for a variety of the noted speeds and speed ranges, and for driver behaviors and preferences, as well as for various environmental, traffic, and roadway conditions, such that the more complex modes of operation and component interactions of HEV 100 can be adjusted and controlled in various ways to improve efficiency and performance.

The disclosure contemplates enabling and utilizing SEP 300, STP 320, and WTP 325, in analogous ways to what those skilled in the technology may refer to as a tuning or performance map is utilized for enabling and improving engine control unit ECU 225 performance during operation of ICE 115 in combustion engine vehicles. In such simplified systems, the tuning map identified for various engine speeds, target settings for air-fuel ratio, control of idle speeds, control of variable valve timing, electronic valve settings, ignition timing, and the like. This concept is expanded in the disclosure to enable additional capabilities for the substantially more complex interactions of multiple propulsion and power management systems.

With multiple propulsion systems interacting during operation, the simplified tuning map for ECU 225 must be modified to account for many additional dimensions of variables that can affect not only the noted tuning map variables and settings, and the resultant performance of ICE 115, but also that of the other propulsion and power management systems. In addition to enabling improved control and management of ICE 115 and ECU 225, REP 300, STP 320, and WTP 325 further enable cooperatively improved control and management of EM(s) 120 as well as HV battery(ies) 175, MCM/BCM/power electronics 185, and PCU/PCM 215.

Further, utilization of such controllers in cooperation with the additional computing and processing resources enabled by VSC 200, VCS 205, and the other controllers of HEV 100, REP 300, STP 320, and WTP 325 can be configured with many additional dimensions of data that include for example, ICE 115 speed, EM(s) 120 speed, battery(ies) 175 charge/discharge and power conversion rates, and/or HEV 100 speed, such that in addition to including a tuning map being calibrated with optimal target variables, settings, and parameters for a range of ICE 115 speeds, optimal targets can be calibrated for a range of EM 120 speeds and power settings, HEV 100 speeds, and efficiencies for ICE 115, EM(s) 120, battery(ies) 175, and a wide range of operative interactions between ICE 115, EM(s) 120, battery(ies) 175, and the associated controllers and computing resources, as well as far ranging environmental, roadway, and traffic conditions.

AWE 330 may further include and/or be generated according to actual fuel and/or battery power consumption, which results from utilization of REP 300, STP 320, and/or WTP 325 during operation, and which may be generated, identified, and communicated utilizing one or more common units of measure known to those with skill in the technology area, and may include for example, such as miles or kilometers per gallon of fuel and/or miles or kilometers per kilowatt of battery power, watt-hours per mile or kilometer, among various equivalent units of measure and related conversions therebetween.

In one example, AWE 330 is generated cumulatively and/or for individual roadway segments and respective CSDs 305 and time spans over the contemplated roadway segments, and according to the amount of ICE 115 and/or EM 120 power in watt-hours (or any other suitable units of measure) expended compared to the work done (the product of forces and distances) to move HEV 100 over such spans, less aerodynamic, electrical, and physical/mechanical efficiency losses, during a time needed for HEV 100 to travel the distance of each segment (in miles, kilometers, or any other suitable distance unit of measure) over the total distance between LOC 335 and the DD(s).

Such AWE 330 data may also be utilized to generate various actual and optimal target efficiency parameters, variables, and conditions utilized with and to adjust, calibrate and optimize one or more of REP 300, CSD 305, VPPs 310, STP 320, WTP 325, and other parameters. Persons skilled in the relevant technology areas may be able to generally understand that efficiency of HEVs 100 can be measured in many ways. In an example according to the disclosure, efficiency can be generally measured by comparing the power generated by burning gasoline or another fuel and by discharging battery(ies) 175, 180, with the work done by causing HEV 100 to do work by traveling to one or more DDs. Such a measure of efficiency is typically reduced by efficiency losses due to thermodynamic, aerodynamic, and mechanical energy losses that are incurred during operation of HEV 100, as described in further example elsewhere herein. Such efficiency considerations are in turn utilized to determine the optimal target parameters, variables, and conditions in the generated REP 300, STP 320, WTP 325, and other parameter profiles.

In further arrangements according to the disclosure, the controller(s) is/are also configured to generate REP 300 according to EVCs 315, which include for purposes of further examples, the changing and/or instantaneous feedback signals OS 245 that communicate, during cruise control operation of HEV 100, at least one, and/or one, two, or more of posted roadway speed limit, terrain or roadway inclination and elevation, wind speed and direction, precipitation, nearby traffic speed and distance, vehicle to vehicle traffic proximity and roadway congestion data, and atmospheric pressure, temperature, and humidity, and infrastructure to vehicle roadway condition data, among other environmental conditions that are external to and/or proximate to HEV 100.

The controller(s) is/are also adapted to adjust vehicle cruise speed CSD 305 to adaptively extend range of HEV 100, according to one or more of CCS 240, REP 300, VPPs 310, EVCs 315, and related data. The adaptively adjusted CSD 305 enables HEV 100 to reach the at least one and/or one or more designated destinations DDs in a minimum and reduced span of time TS 355. As also described elsewhere herein, the controller(s) are further configured to minimize and/or reduce TS 355, by controlling and adjusting CSD 305 from the initial cruise control set speed, according to REP 300 and other profiles, parameters, conditions, and data. When the controller(s) initiate the cruise control mode, and set the initial cruise control speed CSD 305, TS 355 is also initially predicted.

In these configurations, the controller(s), including onboard and offboard navigation devices and applications may receive the one or more DDs, and utilize the current geographic position of HEV 100 from LOC 335, in addition to EVCs 315 received from internal and/or external devices, servers, and/or other sources, to establish a trip path and predicted duration or time span to the one or more DDs, according to the REP 300, VPPs 310, EVCs 315, energy limits (LMs), and other data. Further, real-time vehicle performance data and changing EVCs 315 are utilized to refine the predicted trip duration and/or time span.

The adjusted CSD 305 also moderates and controls consumption of the available fuel and/or electric battery power by HEV 100, during cruise control operation, such that at least one or more respective reserve energy limits LMs of battery power and fuel 340, 345 are maintained at or above such LMs upon HEV 100 reaching the one or more designated destination(s) DDs. Such LMs may be predetermined initially and stored and retrieved from repository 230 or another of the contemplated controllers of HEV 100.

In additional modifications, the at least one or more respective reserve energy limits LMs are predetermined, adjustable, and/or selectable, and are directed to a fuel reserve energy limit (FLM) 340 that identifies, includes, and/or establishes a minimum quantity of fuel, and/or a battery power reserve energy limit BLM 345 that includes, identifies, and/or establishes a minimum state of charge (SoC) of one or more of the vehicle traction battery(ies) 175, 180. Such LMs may be utilized as desired to establish such reserves to account for unknown variables and conditions that may affect the accuracy of predicted vehicle range and target profile efficiencies.

In various other arrangements, the controller(s) are also configured to generate one or more error signal(s) ESs 350, according to AWE 330 and REP 300, which ESs 350 identify, among other data, a magnitude of one or more differences between REP 300 and AWE 330 during cruise control operation, and as CSD 305 is adjusted. In additional configurations, ESs 350 identify, include, embody, establish, and/or communicate the difference between REP 300 as established by the instantaneous, changing, dynamic, and stochastic VPPs 310 and/or EVCs 315, and the AWE 330. The controller(s) utilize ESs 350 and feedback signals OS 245 to improve the accuracy of prospectively generated REPs 300 as well as the underlying target profiles TPs such as the speed target profile 320 and the WTP 325 target efficiency indicator.

The controller(s) of the disclosure are further modified in other variations to adjust CSD 305 adaptively according to and as ESs 350 change over time, and such that magnitude (s) of such ESs 350 are prospectively reduced. The controller(s) also adjust the predicted, optimal CSD 305 of the REP 300 and related profiles, as well as related VPPs, during cruise control operation. This in turn enables a more accurately predicted HEV performance and efficiency, such that HEV 100 may utilize cruise control operation to reach the one or more DDs, without exhausting battery power and/or fuel below the respective FLM 340 and/or BLM 345, and such that time to reach the one or more DDs is minimized. The reduced ESs 350 reflect increased accuracy in such predicted and/or estimated REPs 300, and the related VPPs 310, and other profiles, data, and parameters. The improved accuracy also further ensures HEV 100 can reach the one or more DDs especially during circumstances of low and/or near exhausted fuel and/or battery power.

Such improved accuracy as contemplated by and described in the disclosure also enables improved vehicle designs that utilize less weight, are manufactured with lower cost, which have decreased operating expenses, and which thereby also enable reduced or minimized time to reach the DDs, even when power/fuel is low or near exhausted or empty. Further variations of the disclosure include HEV 100 having the controller also modified to communicate the described data between and/or to one or more other vehicle and/or external controller(s), one or more of vehicle HMIs and displays 190 and/or NMDs 295, and/or other internal and/or external components.

Such communicated data includes for example, the REP 300, AWE 330, and/or one or more of the changing and/or instantaneous VPPs 310 and EVCs 315, and/or one or more additionally generated and predicted variables and data elements that include, for purposes of further examples, an instantaneous or real-time vehicle range (IVR) 360 of remaining energy in w-h/m (or w-h/km) for HEV 100, which is updated periodically and/or in real-time, which determines available reserve energy in the form of remaining fuel/battery power, and according to FLM 340 and BLM 345. IVR 360 represents the minimum energy remaining in HEV 100, and more specifically, in the battery(ies) 175, 180, as may be limited by BLM 345, and a minimum fuel requirement for ICE 115 as established by FLM 340, if any. One or more of such additionally generated and predicted variables may be communicated for display, in displays 190, navigation system 206, NMDs 295, and others, periodically and in real-time, and again at and/or when the HEV reaches the one or more and/or at least one DD(s).

Still other additionally contemplated arrangements of the controller(s) of HEV 100 include continuous and/or periodic generation, at discrete or changing time intervals, of REP 300, CSD 305, VPPs 310, EVCs 315, STPs 320, WTPs 325, AWEs 330, and other related data, parameters, conditions, and signals. Such discrete, predetermined, and/or changing periodic time intervals may be, for example, intervals of microseconds, milliseconds, every second, or every few seconds or every few minutes, and at fractions and multiples thereof, and/or at other preferred times and/or intervals as may be desired.

The disclosure is further directed to controller(s) configured to receive one or more selections of and/or changes to the one or more DDs and/or the one or more respective FLM 340 and/or BLM 345, which can enable additionally extended vehicle range IVR 360 when FLM 340 and/or BLM 345 are lowered. These arrangements also include the controller(s) modified to adjust CSD 305 adaptively according to the received changes and/or selections, such that HEV 100 reaches the at least one DD(s) in a new minimum and/or reduced time span TS 355.

The contemplated DDs and changes thereto are utilized in other variation to optimize and minimize or reduce trip time span or duration, and in the context of the disclosure to minimize and reduce TS 355 of such trips, and subject to the constraints of IVR 360, the set and/or adjusted cruise control speed CSD 305, and posted roadway speed limits, and traffic, roadway, and environmental conditions of EVCs 315. In further exemplary configurations, the controller(s) are modified to generate the minimized TS 255 as a function of distance divided by time, and for example the distance between LOC 335 and DD, divided by the generated CSD 305 for the distance.

In exemplary practical implementations according to the disclosure, the total distance between LOC 335 and DD is the sum of the cumulative distances of roadway segments, which may be individually identified and established by the navigation systems described elsewhere herein. The generated CSD 335 is similarly determined for each such roadway segment according to posted roadway speed limits, and traffic, roadway, and environmental conditions of EVCs 315, which in whole and/or in part may be generated by, and/or received from such navigation systems and stored and communicated by way of EVCs 315 and other parameters of the disclosure.

Further, AWE 330 is also utilized in other arrangements of the disclosure to determine the minimum, reduced TS 355, which is also generated as a function of IVR 360, FLM 340, BLM 345, and such that AWE 330 and related efficiency factors is determined for each such roadway segment. In some variations, IVR 360 may also be modified by an additional predetermined and/or dynamically generated factor of safety, which is utilized to ensure battery and/or fuel energy is not unexpectedly expended beyond the limits of FLM 340 and/or BLM 345, due to unanticipated and/or stochastic efficiency losses, performance and environmental variations, and lifecycle or acute changes in operating conditions of ICE 115, battery(ies) 175, power electronics 185, and other components of HEV 100.

In other exemplary variations of the disclosure, TS 355 may be discretely optimized to be minimized and/or reduced, from the TS 355 initially predicted according to the initial set cruise speed when cruise control mode is engaged. TS 355 is optimized and reduced as a function of IVR 360, REP 300, CSD 305, VPPs 310, EVCs 315, STP 320, WTP 325, and real-time, instantaneous AWE 330, such that CSD 305 of HEV 100 is adjusted and increased from the initial set speed, which reduces the initially predicted TS 355, and causes HEV 100 to exhaust IVR 360 at be zero upon arriving and reaching the one or more DDs, subject to FLM 340 and/or BLM 345, as may be appropriate under the current operating circumstances.

AWE 330 in other variations is generated according to one or more VPPs 310 and EVCs 315, that may further include, as described in part elsewhere herein, and for purposes of further examples, an electrical efficiency factor, an electrical and combustion and mechanical temperature efficiency factor, and a mechanical energy efficiency factor. Such an electrical efficiency factor represents the energy losses incurred when stored power is discharged from battery(ies) 175, 180 and converted by power electronics 185 and other components to supply energy to EMs 120 and other components and accessories of HEV 100.

The temperature efficiency factor accounts for efficiency losses that change with changing environmental and component temperatures during operation of HEV 100. For example, ICE 115. EMs 120, battery(ies) 175, 180, and power electronics 185 can see degraded performance and efficiency during operation at cold temperatures and very warm temperatures. Such temperature changes can also affect performance of lubricating oils and fluids in various components of HEV 100. The contemplated mechanical energy efficiency factor accounts for efficiency losses incurred when kinetic energy of the moving HEV 100 is converted to electrical energy during regenerative braking, during rotation of tires over a roadway that incur rolling resistance and frictional energy losses, when energy stored in fuel is converted to power by ICE 115, and/or when HEV 100 traverses the roadway incurring aerodynamic resistance, elevational changes that incur losses as potential and kinetic energy are exchanged.

With continued reference to FIG. 1, and now also to FIG. 2, methods of operation of the disclosure include methods of controlling vehicle and HEV 100. In view of the components, controllers, systems, and capabilities already described, such methods contemplate enabling such methods by the controller(s) designated here generally as controller(s) 400, and which may include for purposes of illustration but not for purposes of limitation, at least one of and/or one or more of controller(s) VSC 200, VCS 205, PCU 215, TCU 220, MCM/BCM 185, and/or ECU/EMS 225, as well as communication unit(s) and transceivers AT, VSC 200, V2V 201, V2I/I2V 202, and/or VCS 205, among others.

Such methods of operation start at step 405, and at step 410 include monitoring for and detecting CCS 240 by controller(s) 400, which identifies initial and/or continuing vehicle cruise control operation and use. The controller(s) 400 at step 415 also are configured with the methods for detecting the one or more DDs, and at step 420, detecting an initial set speed CSD 305, and detecting changing and/or instantaneous VPPs 310 and EVCs 315, and/or other vehicle data and parameters, including one or more of and/or at least one of STP 320, WTP 325, LOC 335, FLM 340, BLM 345, and others.

If CCS 240 is detected at step 405, but DDs are not detected at step 415, control returns to start step 405 for continued monitoring for DDs being identified. Utilizing these detected data elements, the controller(s) 400 of the methods at step 425, also further include generating and/or communicating REP 300 according to such changing and/or instantaneous VPPs 310 and EVCs 315, and/or other vehicle data and parameters.

At step 430, in response to the generated REP 300, the method detects whether HEV 100 has IVR 360 that can reach the one or more DDs, according to the REP 300, which accounts for available fuel and/or battery power remaining as a function of current location LOC 335, and VPPs 310 and EVCs 315, and other parameters, conditions, and data. If HEV 100 is within range and has IVR 360 within of the one or more DDs at the current, initially set CSD 305, then CSD 305 remains unchanged. Otherwise, control of the methods passes by the controller(s) 400 to step 435, and CSD 305 is adjusted according to the REP 300 and underlying parameters, conditions, and other data.

After adjusting CSD 305, the controller(s) 400 pass control of the methods to step 440 to detect and predict IVR 360 of HEV 100 and actual vehicle performance efficiency by generating AWE 330, according to actual, real-time, instantaneous VPPs 310, EVCs 315, and other parameters and conditions. Controller(s) 400 at step 445 compare HEV 100 IVR 360 and AWE 330 to the predicted and/or estimated REP 300, VPPs 310, EVCs 315, STP 320, WTP 325, FLM 340, BLM 345, and other parameters, conditions, and/or data, and detect whether at the currently adjusted CSD 305 and detected AWE 330, fuel and/or battery power energy will be exhausted below one or more of FLM 340 and/or BLM 345, such that HEV 100 IVR 360 does not extend to the one or more DDs.

If so, then control of the methods passes again by controller(s) 400 to step 435, and CSD 305 again adjusted to decrease CSD 305 by increasing AWE 330, thereby extending IVR 360 of HEV 100, while preventing available energy limits of fuel and/or battery power from decreasing below one or more of FLM 340 and/or BLM 345. In contrast, if fuel and/or battery power, as detected and predicted at step 445, will not be exhausted to exceed and decrease below FLM 340 and/or BLM 345, then the methods pass control to step 450.

The controller(s) 400 at step 450, are configured to minimize the time span TS 355 needed for REV 100 to reach the one or more DDs. The methods include controller(s) 400 further adapted at step to predict and detect whether at the currently adjusted CSD 305 and detected AWE 330, extra or more fuel and/or battery power will remain, when HEV 100 reaches the one or more DDs, such that available energy and IVR 360 of HEV 100 extends beyond the one or more DDs.

If extra IVR 360 and more fuel and/or battery power is predicted to exist, once HEV 100 reaches the one or more DDs, then the time span TS 355 to reach the DDs can be decreased and minimized, by increasing CSD 305 and lowering AWE 330. In this circumstance, the controller(s) 400 of the methods pass control again to step 435, whereby the controller(s) adjust and increase CSD 305 and in turn decrease AWE 330, to increase cruise speed of HEV 100 and reduce the extra available IVR 360, fuel, and battery power, such that TS 355 is minimized. Otherwise, the methods of controller(s) 400 pass control again to step 405 to continue monitoring during cruise control operation of HEV 100, as well as to step 455 to enable further cruise control capabilities according to the disclosure.

The controller(s) 400 at step 455 of the methods compare one or more of REP 300, STP 320, WTP 325, and other predicted and/or estimated performance parameters, conditions, efficiencies, and profiles, to actual AWE 330 and other actual performance parameters, conditions, efficiencies, and profiles, and to generate ES 350 to have a magnitude that increases as the difference increases between predicted/estimated variables and the actual performance variables of HEV 100 during cruise control operations.

As such predicted/estimated to actual performances differences decrease, the magnitude of ES 350 also decreases so as to enable a feedback signal OS 245 that measures the accuracy of the predicted/estimated REP 300 and other profiles and data, such that cruise speed CSD 305 and the predicted/estimated profiles and other data can be further adaptively adjusted, at step 460, according to actual performance of HEV 100 and to thereby improve accuracy of the cruise control system of the disclosure.

Further variations of the methods of the disclosure also include controller(s) 400 configured to automatically adjust one or more of FLM 340 and/or BLM 345 in some configurations of the method steps, when appropriate to enable lower energy reserve limits, such that IVR 360 of HEV 100 is extended to reach the one or more DDs. Additional modifications also include the controller(s) 400 configured to receive changes to at least one or more DDs, FLM 340, and/or BLM 345, and other profiles, parameters, conditions, and data, from various other controller(s), components, switches, HMIs, and other sources, such as those schematically depicted at step 465 of FIG. 2 and in FIG. 1, which can be in communication both wirelessly, via CAN 210, and by other communications capabilities as described elsewhere herein.

Other arrangements of the methods of operation and controller(s) 400 contemplate communicating various predicted, estimated, and actual performance parameters, conditions, profiles, and related data to such other internal and external controller(s), displays, HMIs, components, systems, and subsystems as described elsewhere herein. When cruise control operation is discontinued, the controller(s) 400 of the methods pass control to end step 470, and again to start step 405 for continued monitoring for CCS 240.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
 a powertrain coupled with a traction battery and controller configured to,
 responsive to detecting an activation of cruise control and a designated destination, generate a route efficiency profile, the route efficiency profile being related to an instantaneous vehicle range,
 determine if the designated destination is within the instantaneous vehicle range based on the route efficiency profile,
 responsive to determining that the designated destination is not within the instantaneous vehicle range, operate the powertrain to decrease a cruise speed from an initial speed set upon initiating the cruise control to increase the route efficiency profile thereby extending the instantaneous vehicle range beyond the designated destination, and
 responsive to determining that the instantaneous vehicle range is beyond the designated destination based on the route efficiency as increased, increase the cruise speed to decrease the route efficiency profile.

2. The vehicle according to claim 1, comprising:
 the controller configured to:
 generate an error signal according to an actual efficiency, according to changing vehicle performance parameter and environmental conditions, and the route efficiency profile that includes optimal vehicle performance parameter targets;
 adjust one or more of the cruise speed and profile adaptively according to the error signal; and
 such that a magnitude of the error signal is reduced.

3. The vehicle according to claim 1, comprising:
 the controller configured to:
 generate the route efficiency profile according to changing vehicle performance parameters that include speed target and watt-hour per mile efficiency target profiles, which target profiles are adjusted according to feedback signals that communicate actual watt-hour per mile efficiency and two or more of vehicle position, mass, tire pressure, drag, vehicle accessory load, and remaining energy available;
 generate an error signal according to the target profiles and the actual watt-hour per mile efficiency; and
 adjust one or more of the cruise speed and the profiles adaptively in response to the error signal, such that a magnitude of the error signal is reduced.

4. The vehicle according to claim 1, comprising:
 the controller configured to:
 adjust the route efficiency profile according to changing vehicle performance parameters that include speed and watt-hour per mile efficiency target profiles, which are adjusted according to feedback signals that communicate actual watt-hour per mile efficiency and two or more of vehicle position, mass, tire pressure, drag, vehicle accessory load, and remaining energy available.

5. The vehicle according to claim 1, comprising:
 the controller configured to:
 adjust the route efficiency profile according to environmental conditions that include instantaneous feedback signals that communicate two or more of posted speed limits, terrain inclination and elevation, wind speed and direction, nearby traffic speed and distance, and atmospheric pressure, temperature, and humidity.

6. The vehicle according to claim 1, comprising:
 the designated destination includes two or more destinations; and
 the controller configured to adjust one or more reserve energy limits such that vehicle range extends to the two or more destinations.

7. The vehicle according to claim 1, comprising:
 the controller configured to communicate to another controller one or more of changing vehicle performance parameters and environmental conditions, and one or more predicted variables that include real-time vehicle range, trip time span, and reserve energy remaining at the designated destination.

8. The vehicle according to claim 1, comprising:
 the controller configured to:

communicate one or more predicted variables that include instantaneous vehicle range, trip time span, and reserve energy remaining at the designated destination;
receive one or more changes to: the designated destination and one or more reserve energy limits of battery power and fuel; and
adjust the cruise speed adaptively according to the changes, to reach the designated destination in a reduced time span.

9. The vehicle according to claim 1, wherein the vehicle is further powered by a conventional engine consuming conventional fuel including gasoline and diesel, the controller is further configured to: adjust the route efficiency profile using a level of remaining conventional fuel.

10. A vehicle, comprising:
a battery coupled to a controller configured to:
initiate a cruise control responsive to a cruise signal;
responsive to detecting a designated destination, generate a route efficiency profile, the route efficiency profile being related to an instantaneous vehicle range,
determining if the designated destination is within the instantaneous vehicle range based on the route efficiency profile, and
responsive to determining that the designated destination is not within the instantaneous vehicle range, operate a powertrain to decrease a cruise speed from an initial speed set upon initiating the cruise control to increase the route efficiency profile thereby extending the instantaneous vehicle range beyond the designated destination.

11. The vehicle according to claim 10, comprising: the controller configured to:
generate an error signal according to an actual efficiency and the route efficiency profile that includes one or more vehicle performance parameters and environmental conditions;
adjust one or more of the cruise speed and profile adaptively according to the error signal; and
such that a magnitude of the error signal is reduced.

12. The vehicle according to claim 10, comprising: the controller configured to:
adjust a route efficiency profile according to real-time feedback signals that communicate vehicle performance parameters including speed target and watt-hour per mile efficiency target profiles,
which target profiles are adjusted according to the feedback signals that also communicate actual watt-hour per mile efficiency and two or more of vehicle position, mass, tire pressure, drag, vehicle accessory load, and remaining energy available;
generate an error signal according to the target profiles and the actual watt-hour per mile efficiency; and
adjust one or more of the cruise speed and profiles adaptively in response to the error signal, such that a magnitude of the error signal is reduced.

13. The vehicle according to claim 10, comprising:
the designated destination includes two or more destinations; and
the controller configured to adjust one or more reserve energy limits such that vehicle range extends to the two or more destinations.

14. The vehicle according to claim 10, comprising: the controller configured to:
communicate one or more predicted variables that include instantaneous vehicle range, trip time span, and reserve energy remaining upon reaching the designated destination;
receive one or more changes to: the designated destination and a battery SoC; and
adjust the cruise speed adaptively according to the changes, to reach the at the designated destination having exhausted the vehicle range in a reduced time span.

15. The vehicle according to claim 10, wherein the controller is further configured to responsive to determining the instantaneous vehicle range is beyond the designated destination based on the route efficiency as increased, increase the cruise speed to revise the route efficiency profile.

16. A method of controlling a vehicle, comprising:
by a controller coupled to a traction battery,
responsive to detecting an activation of cruise control and a designated destination, generating a route efficiency profile, the route efficiency profile being related to an instantaneous vehicle range,
determining if the designated destination is within the instantaneous vehicle range based on the route efficiency profile,
responsive to determining that the designated destination is not within the instantaneous vehicle range, operating a powertrain to decrease a cruise speed from an initial speed set upon initiating the cruise control to increase the route efficiency profile thereby extending the instantaneous vehicle range beyond the designated destination, and
responsive to determining the instantaneous vehicle range is beyond the designated destination based on the route efficiency as increased, increasing the cruise speed to decrease the route efficiency profile.

17. The method according to claim 16, further comprising:
by the controller,
generating an error signal according to an actual efficiency and the route efficiency profile;
adjusting one or more of the cruise speed and profile adaptively according to the error signal; and
such that a magnitude of the error signal is reduced.

18. The method according to claim 16, further comprising:
by the controller,
adjusting the route efficiency profile according to instantaneous feedback signals that communicate vehicle performance parameters including speed target and watt-hour per mile efficiency target profiles, which target profiles are adjusted according to the feedback signals that also communicate actual watt-hour per mile efficiency and two or more of vehicle position, mass, tire pressure, drag, vehicle accessory load, and remaining energy available;
generating an error signal according to the target profiles and the actual watt-hour per mile efficiency; and
adjusting one or more of the cruise speed and profiles adaptively in response to the error signal, such that a magnitude of the error signal is reduced.

19. The method according to claim 16, further comprising:
by the controller,
communicating one or more predicted variables that include instantaneous vehicle range, trip time span, and reserve energy remaining at the designated destination;
receiving one or more changes to: the destination and one or more reserve energy limits of battery power and fuel; and adjusting the cruise speed adaptively according to the changes, to reach the designated destination in a reduced time span.

* * * * *